A. LEWIS.
Hand-Power Vehicle.
No. 204,674.                Patented June 11, 1878.
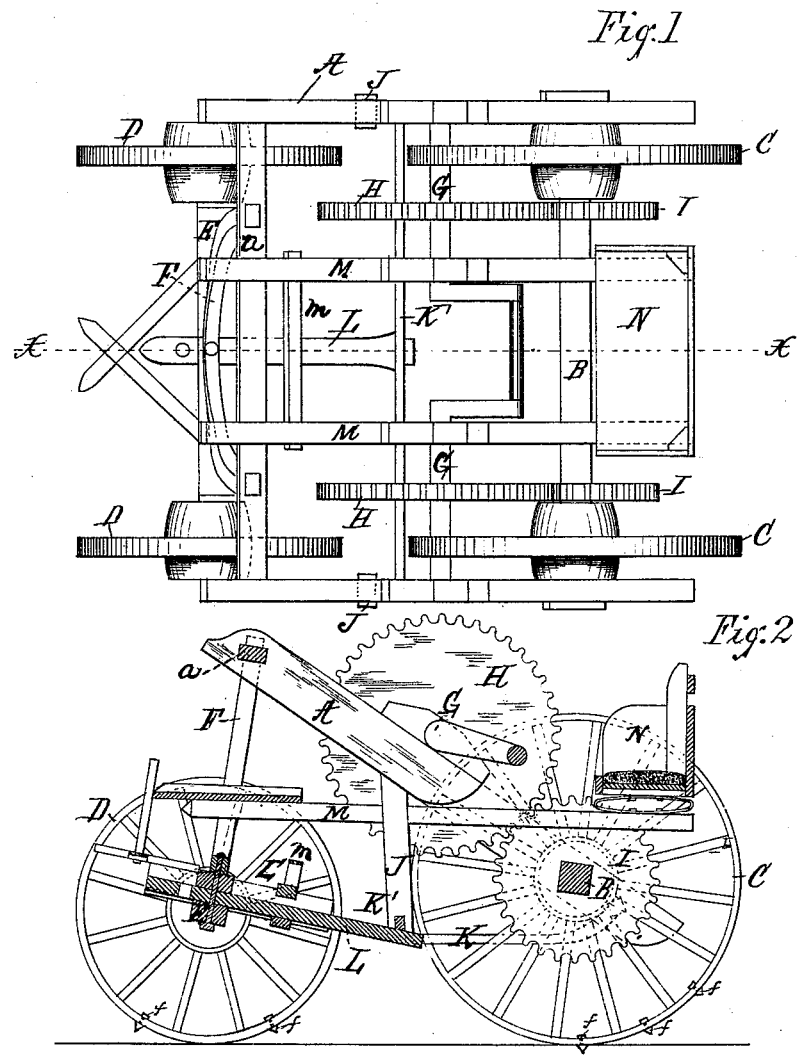

UNITED STATES PATENT OFFICE.

ANDREW LEWIS, OF DOWNER'S GROVE, ILLINOIS.

IMPROVEMENT IN HAND-POWER VEHICLES.

Specification forming part of Letters Patent No. 204,674, dated June 11, 1878; application filed March 16, 1878.

*To all whom it may concern:*

Be it known that I, ANDREW LEWIS, of Downer's Grove, in the county of Du Page and State of Illinois, have invented certain new and useful Improvements in Hand-Power Vehicles; and I do hereby declare the following to be a full, clear, and exact description thereof, which will enable others skilled in the art to which my invention appertains to make and use the same, reference being had to the accompanying drawing, forming part of this specification, in which—

Figure 1 represents a general plan or top view of a hand-power vehicle embodying my said invention; and Fig. 2 represents a longitudinal central section of the same on the line x x, Fig. 1.

Like letters of reference indicate like parts.

The object of my invention is to improve the construction of hand-power vehicles now in use, so as to render them more easily propelled; and to that end my invention consists in the arrangement of the several parts, as hereinafter described and claimed.

In the drawing, A represents the main frame, which may be made in the form shown, or in any suitable form that will receive the operating parts.

B represents a transverse shaft, which is journaled at its ends within the side pieces of the frame A, at the rear end thereof, and so as to freely revolve.

C C represent the main driving-wheels, which are permanently mounted upon shaft B near the side pieces of the frame, as shown in Fig. 1, and so as to support the rear end of the frame.

D D are the front or guiding wheels, which are loosely mounted upon an axle, E, located under the forward end of the frame.

F is a U-shaped brace or support, which is permanently attached at its upper ends to the forward cross-bar *a* of the frame A, and is pivoted at its lower end to the center of the axle E, so as to allow said axle to turn upon the pivot sufficient to change the angle of the wheels relative to the line of the forward movement of the vehicle for the purpose of guiding the same.

G is a crank-shaft, which is journaled to the frame A at a point forward of the shaft B, and is so arranged as to freely revolve.

H H are gear-wheels, which are permanently mounted upon the crank-shaft G, and are adjusted to engage with corresponding gear-pinions I I on the shaft B, by which means a rotary movement is imparted to the said shaft B and to the main driving-wheels by the rotation of the crank-shaft.

J J are pendants, which are attached to the side pieces of the frame A, and extend downward so that their lower ends will be in the same plane with the horizontal center of the axle E, and are each connected at the lower end to a tie-brace, K, which extends backward to the rear end of the frame, and is connected permanently therewith.

K' is a transverse bar, which is permanently secured to the lower end of the pendants, so as to be in the same plane with the axle E.

L is the reach, which is connected at its rear end to the center of the bar K', and extends forward through the sway-bar L', and is pivoted at its forward end to the axle E in the usual manner, by which means the axle is connected with the frame-work and in a line with the draft.

M M are longitudinal bars, which are each attached at the forward end to the side pieces of the brace F, respectively, and extend horizontally backward to the rear end of the frame.

N represents the seat, which is supported upon the rear end of the bars M M, as shown in Fig. 2, and in the proper position to enable the operator to conveniently reach and turn the crank of the shaft G when occupying the seat.

Permanently attached to the sway-bar is a foot-piece, *m*, which is in the proper position to allow the feet of the operator to rest upon it when occupying the seat, by which means the operator can readily guide the vehicle when in motion.

The seat N is so arranged upon the bars M M as to admit of being moved toward or from the crank-shaft G, the object of which is to allow the same to be adjusted to suit persons of different heights when turning the crank.

The main driving-wheels are each provided with a series of lugs, f, arranged at regular intervals upon the periphery or face of the tire, as shown in Fig. 2, the object of which is to prevent the driving-wheels from slipping on the ground. These lugs are so connected to the wheels as to admit of being removed when desired, the object of which is to allow the same to be removed when the vehicle is to be used on a paved street or sidewalk, and thus prevent the vehicle from being jarred by the contact of the lugs with the pavement as the vehicle is moved forward.

In using my said vehicle, the operator, sitting upon the seat N, imparts a rotary motion to the crank-shaft by means of the crank, which motion is communicated to the shaft B and driving-wheels through the medium of the gear-wheels H H and pinions I I, thus imparting a forward movement to the vehicle.

Having thus described my invention, what I claim as new, and desire to secure by Letters Patent, is—

1. The combination, with the frame A, of the shaft B, driving-wheels C C, crank-shaft G, gear-wheels H H, pinions I I, and movable seat N, all arranged with relation to each other, substantially as and for the purpose specified.

2. The combination, with the frame A, axle E, and wheels D D, of the U-shaped brace F, pendants J J, tie-braces K K, cross-bar K', and reach L, substantially as and for the purpose specified.

ANDREW LEWIS.

Witnesses:
G. R. HOFFMAN,
N. C. GRIDLEY.